United States Patent Office 3,265,745
Patented August 9, 1966

3,265,745
PRODUCTION OF DIHALOCARBENE ADDUCTS
Dietmar Seyferth, Arlington, Mass., and James M. Burlitch, Wheeling, W. Va., assignors to Ethyl Corporation, New York, N.Y., a corporation of Virginia
No Drawing. Filed Oct. 26, 1962, Ser. No. 233,463
13 Claims. (Cl. 260—648)

The present invention relates to and has as its chief object, the provision of a novel organometallic route to 1,1-dihalocyclopropanes.

These and other objects are accomplished by reacting together a mixture comprising a trihalomethyl substituted mercurial and an unsaturated organic compound. 1,1-dihalocyclopropanes are produced in yields as high as 90 percent by this reaction—the internal nucleophilic attack is thus surprisingly facilitated by the presence of metal whose electropositivity is less than hydrogen. (The term internal nucleophilic attack refers to the elimination of a halide ion from the trihalomethyl substituent and the fixation thereof on the metal atom.)

By the term 1,1-dihalocyclopropanes it is meant either 1,1-dihalocyclopropane itself or compounds having substituents on either one or both of the other two carbon atoms in the cyclopropane ring, i.e., the carbon atoms numbered 2 and 3 in the cyclopropane ring.

The essential feature of the mercurial is the presence thereon of the trihalomethyl group bonded directly to the metal atom by a carbon-to-metal bond. The nature of the substituent occupying the remaining valence of the mercury atom is not of extreme importance provided that it has no deleterious effect on the reaction. For example, excellent results are achieved when the other substituent is a halide (fluoride, chloride, bromide and iodide). Excellent results are also achieved by employing trihalomethyl mercurials having bonded thereto an organic radical, having up to about 20 carbon atoms, attached to the metal atom by a carbon-to-metal linkage. A very wide variety of organic radicals can be employed, however, if best results are to be achieved it is quite important to avoid radicals containing olefinic unsaturation due to the fact that radicals containing carbon-to-carbon multiple bonds will enter into the reaction, thus reducing yields. The aromatic double bond can be present in the organic radical, although it is recommended that condensed ring aromatic unsaturation be avoided because it will also cause significant reduction in yields. The organic radical may contain atoms other than carbon and hydrogen, for example, oxygen, sulfur, nitrogen, chlorine, fluorine, bromine, and iodine.

Accordingly, a preferred embodiment of this invention is to employ, as the trihalomethyl mercurial reagent, compounds having the formula:

R—Hg—CX₃ wherein X is a halogen and R is a radical selected from the group consisting of alkyls, cycloalkyls, mononuclear aryls, haloalkyls, halocycloalkyls, halomononuclear aryls, fluorine, chlorine, bromine, and iodine. When R is an organic radical it can contain up to about 20 carbon atoms.

A very significant and interesting highlight of this invention is the discovery that the presence of a bromide substituent in the trihalomethyl group dramatically increases reaction rates. (This phenomenon is clearly illustrated by the ensuing examples.) It has been observed that even though phenyltrichloromethyl mercury gives excellent yields, e.g., 85-90 percent, reaction periods often exceed 48 hours. However, when the bromide substituent is present, as in the case of phenyl(tribromomethyl) mercury, phenyl(bromodichloromethyl)mercury, and phenyl(dibromochloromethyl)mercury the same excellent yields are achieved in periods often shorter than 2 hours. Therefore an exceptionally preferred embodiment of this invention is the use of mercurials having the formula:

R—Hg—CBr<sub>n</sub>X<sub>3-n</sub>

wherein R is as hereinabove defined and X is selected from the group consisting of fluorine, chlorine, and iodine and n is an integer from 1–3. This embodiment offers a very advantageous synthetic method for producing dihalocarbene adducts.

The trihalomethyl substituted mercurials which can be employed in this invention are:
Methyl(trichloromethyl)mercury,
Ethyl(trichloromethyl)mercury,
2-chloroethyl(trichloromethyl)mercury,
Isopropyl(trichloromethyl)mercury,
Isobutyl(trifluoromethyl)mercury,
Pentyl(triiodomethyl)mercury,
Methyl(tribromomethyl)mercury,
p-bromophenyl(tribromophenyl)mercury,
Ethyl(tribromomethyl)mercury,
Isopropyl(tribromomethyl)mercury,
n-butyl(tribromomethyl)mercury,
Isobutyl(tribromomethyl)mercury,
1-2-difluoro-n-butyl(trichloromethyl)mercury,
n-hexyl(tribromomethyl)mercury,
n-decyl(tribromomethyl)mercury,
Cyclohexyl(tribromomethyl)mercury,
n-pentadecyl(tribromomethyl)mercury,
n-eicosyl(tribromoethyl)mercury,
2,4-dichlorophenyl(tribromomethyl)mercury,
o-toly(tribromomethyl)mercury,
p-tolyl(tribromomethyl)mercury,
Methyl(bromodichloromethyl)mercury,
Methyl(dibromochloromethyl)mercury,
Ethyl(bromodichloromethyl)mercury,
Isopropyl(bromodichloromethyl)mercury,
Isobutyl(bromodichloromethyl)mercury,
Isopropyl(bromodichloromethyl)mercury,
Isopropyl(dibromochloromethyl)mercury,
n-hexyl(bromodichloromethyl)mercury,
Cyclohexyl(dibromochloromethyl)mercury,
n-eicosyl(bromodichloromethyl)mercury,
Phenyl(bromodichloromethyl)mercury,
Phenyl(dibromochloromethyl)mercury,
o-tolyl(bromodichloromethyl)mercury,
o-tolyl(dibromochloromethyl)mercury,
Diphenyl(bromodichloromethyl)mercury,
Methyl(diiodobromomethyl)mercury,
Ethyl(bromodifluoromethyl)mercury,
Isopropyl(iododibromomethyl)mercury,
Isobutyl(dibromofluoromethyl)mercury,
Phenyl(bromodifluoromethyl)mercury,
Phenyl(dibromofluoromethyl)mercury,
Phenyl(diiodobromomethyl)mercury,
Phenyl(trifluoromethyl)mercury,
Phenyl(triiodomethyl)mercury,
Chloro(trichloromethyl)mercury,
Bromo(trifluoromethyl)mercury,
Fluoro(triiodomethyl)mercury,
Bis(trichloromethyl)mercury,
Bis(tribromomethyl)mercury,
Phenyl(iodobromochloromethyl)mercury,
and the like.

Of the above, distinctly preferred mercurials, from the standpoint of reactivity, are those containing bromide substituents on the methyl component and particularly those wherein the other component is a phenyl group. Thus, preferred reagents are Phenly(tribromomethyl)mercury,
Phenyl(bromodichloromethyl)mercury,
Phenyl(dibromochloromethyl)mercury,
Phenyl(bromodifluoromethyl)mercury,
Phenyl(dibromofluoromethyl)mercury,
Phenyl(diiodobromomethyl)mercury and the like. Of these from a standpoint of both reactivity and cost-effectiveness it is preferred that the methyl substitutent have attached thereto only bromide and chloride. These highly preferred mercurials are phenyl-(bromodichloromethyl)mercury and phenyldibromochloromethyl)mercury.

The unsaturated organic compounds which are reagents in this process are characterized by the fact that they must contain at least one unsaturated chemical bond within the molecule. These reagents cover a wide range of chemical compounds and generally will comprise organic compounds having up to 25 carbon atoms containing the aliphatic double bond, the aromatic double bond in a condensed ring nucleus, the carbon-to-carbon triple bond, the carbon-to-nitrogen double bond, the carbon-to-nitrogen triple bond, and polymers having a multiple bond as part of the repeating unit. Thus, the unsaturated organic compounds, i.e., dihalocarbene acceptors, used in the present process are olefinic hydrocarbons, acetylenic hydrocarbons, fused ring aromatic hydrocarbons, nitriles, hydrocarbons substituted with from 1 to about 3 divalent unsaturated groups having the formula:

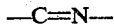

$$—C\!=\!N—$$

e.g., pyrazole, imidazole, 1,2,5-pyrodiazole, 1,2,4-pyrodiazole, 1,3,4-pyrodiazole, 1,2,3-iso-pyrodiazole, 1,2,4-iso-pyrodiazole purine and the like. The following are exemplary of compounds capable of forming an adduct with dihalocarbene.

Ethylene, propylene, butene-1, cis-butene-2, trans-butene-2, isobutylene, diisobutylene, propylene trimer, propylene tetramer, cyclohexene, cyclooctene, cyclopentene, cyclooctadiene-1,5, cyclooctadiene-1,3, bicycloheptene, bicycloheptadiene, anethol, butadiene, isoprene, chloroprene, camphene, styrene, divinylbenzene, alpha-methylstyrene, propylbenzene, allylbenzene, biallyl-dicyclopentadiene, cyclopentadiene, methylcyclopentadiene, methylcyclopentadiene dimer, dihydropyran, dipentene, vinyl chloride, triisobutylene, vinyl butyl ether, vinyl ethyl ether, vinylidene chloride, alpha-pinene, beta-pinene, tetramethylethylene, 2,5-dihydrofuran, diallylether, 4-methylpentene-1, pentene-1, pentene-2, 2-methylbutene-1, 2-methylbutene-2, 3-methylpentene-1, 3-methylpentene-2, hexene-1, hexene-2, octene-1, octene-2, octene-3, decene-1, dodecene-1, tetradecene-1, octadecene-1, hexadecene-1, cholestene, 4-vinylcyclohexene-1, acrolein diethyl acetal, 2-ethylhexene-1, indene, stilbene, dimethyl ketene acetal, diethyl ketene acetal, vinylacetylene, 1-ethylene-1-butylethylene, glycerol triallyl ether, glycerol trivinyl ether, 1,5,9-cyclododecatriene, cyclooctatetraene.

Anthracene, 1 - methoxynaphthalene, 2 - methoxynaphthalene, 9-methoxyphenanthrene, phenanthrene, acenaphthylene.

Benzalaniline, benzalanizine, diethylcarbodiimide.

Acetylene, methylacetylene, hexyne-3, butyne - 1, butyne-2, phenylacetylene, cyclodecyne, diphenylacetylene.

Oleic acid, undecylenic acid, crotonic acid, cinnamic acid, methyl vinyl ketone, mesityl oxide, acrylic acid, methacrylic acid, acrylonitrile, benzalacetone, dibenzalacetone.

Allyl alcohol, crotyl alcohol, methyl vinyl carbinol, cinnamyl alcohol, 3-butene-1-ol.

Equimolar amounts of the unsaturated organic compound and the mercurial may be employed, however, it is desirable to employ an excess of the unsaturated organic compound to insure efficient consumption of the mercurial which will usually be the most expensive reagent. Generally, good results will be obtained when the molar ratio of unsaturated organic compound to mercurial is within the range of from about 1.5:1 to about 10:1. An excellent operating molar ratio is within the range of from about 2:1 to about 5:1.

This process may be conducted at atmospheric pressure in an open vessel or autogenous pressure in a closed vessel. When the unsaturated organic compound is a gas under the reaction conditions pressure will generally be required. The exact temperature for this process depends, of course, on the particular reagents used, and the temperature must be sufficient to effect the reaction between the mercurial and the unsaturated organic compound and, of course, insufficient to decompose the 1,1-dihalocyclopropane formed. Generally good results will be obtained when the temperature is within the range of from about 0° C. to about 150° C. A recommended operating temperature range is from about 30° C. to about 110° C. As was discussed above the reaction times are markedly shortened by the presence of bromine on the methylsubstituent, hence when bromine is present reaction periods may vary from about one-half hour to about 3 hours and when no bromine is present on the methyl substituent reaction periods will vary from about 20 hours to about 50 hours.

This process can be carried out with or without a solvent, however the preferred embodiment is with a solvent. When a solvent is used care should be taken to select one which is either inert to the reaction mixture or one which has an order of reactivity such that it does not compete in the reaction. Such solvents can therefore be termed essentially inert solvents. In order to prevent any possible reactivity of the mercurial with the solvent it is desirable to mix the reagents simultaneously or to mix the mercurial and the unsaturated organic compound first. This gives an extra assurance that high yields will be obtained. It is very important to avoid solvents which have a substantial degree of olefinic unsaturation unless, of course, the solvent is an excess of the unsaturated organic compound selected for use as a reactant. It may be advantageous to avoid the presence of substantial amounts of water in the reaction system. Recommended solvents are saturated hydrocarbons which are liquid under the reaction conditions such as hexanes, heptanes, octanes, decanes, dodecanes, pentadecanes, octadecanes, eicosanes, cyclohexanes, petroleum ether petroleum spirit, kerosene, and the like. Mononuclear aromatic hydrocarbons are also excellent solvents, for example, benzene and toluene.

If desired, the reaction may be conducted under an inert atmosphere such as nitrogen, the rare gases, or the like, although the process has been found to proceed very well in the presence of air.

It is also preferred though not required that the reaction mixture be stirred during the course of the reaction due to the fact that the mercurial reagents are usually substantially insoluble in organic solvents. Stirring or any other suitable means for keeping the reagents in suspension aids in obtaining a smooth, efficient reaction. Other means of agitation may be employed, for instance bubbling an inert gas through the reaction mass or bubbling the acceptor through the reaction mass (provided the acceptor is a gas under the reaction conditions).

*Example I*

A suspension of 0.105 mole of phenyl(tribromoethyl)-mercury in 50 ml. of benzene solvent and 0.315 mole of cyclohexene as the unsaturated organic compound was heated to 90° C. with stirring for 2 hours. During this time the starting mercurial dissolved and the phenylmercuric bromide precipitated. The latter, melting point 285–286° C., was isolated in quantitative yield. Fractional distillation of the filtrate resulted in 22.5 gram (88 percent) of 7,7-dibromobicyclo(4.1.0)heptane.

Example II

A suspension of 0.10 mole of phenyl(trichloromethyl)-mercury in 50 ml. of benzene solvent and 0.30 mole of cyclohexene as the unsaturated organic compound was heated with stirring to 90° C. for 30 hours. During this time the starting material dissolved and phenylmercuric chloride precipitated. Fractional distillation of the filtrate resulted in a 95 percent yield of 7,7-dichlorobicyclo(4.1.0)heptane.

Example III

A suspension of 0.10 mole of phenyl(bromodichloromethyl)mercury in 50 ml. of benzene solvent and 0.315 mole of cyclohexene as the unsaturated organic compound was heated with stirring to 90° C. for 2 hours. During this time the starting mercurial dissolved and phenylmercuric bromide precipitated. Fractional distillation of the filtrate resulted in a 85 percent yield of 7,7-dichlorobicyclo(4.1.0)heptane.

Example IV

A suspension of 0.10 mole of phenyl(dibromochloromethyl)mercury in 50 ml. of benzene solvent and 0.30 mole of cyclohexene as the unsaturated organic compound was heated with stirring to about 90° C. for 2 hours. During this time the starting mercurial dissolved and phenylmercuric bromide precipitated. Fractional distillation of the filtrate resulted in a 91 percent yield of 7-bromo-7-chlorobicyclo(4.1.0)heptane.

The procedure discussed in the above examples can be repeated with other mercurials and other unsaturated organic compounds, for instance; methyl(trifluoromethyl)mercury is reacted with tetramethylethylene to produce 1,1-difluoro - 2,2,3,3 - tetramethylcyclopropane, chloro(diiodobromomethyl)mercury is reacted with ethylene at elevated pressures to produce 1,1-diiodocyclopropane, isobutyl(dibromofluoromethyl)mercury is reacted with propylene under elevated pressures to produce 1-bromo-1-fluoro-2-methylcyclopropane, n-pentatriiodomethyl)mercury is reacted with isobutylene under elevated pressure to produce 1,1-diiodo-2,2-dimethylcyclopropane, cycloheptyl(tribromomethyl)mercury is reacted with styrene to produce 2-phenyl-1,1-dibromocyclopropane, bis(trichloromethyl)mercury is reacted with 1-hexene to produce 2-butyl-1,1-dichlorocyclopropane. It is of course understood that other Group II-B metals may be employed as the metal component of the organometallic reagent, e.g., zinc and cadmium.

The above results, obtained by the use of compounds of a metal which is electronegative with respect to hydrogen, represent a very significant and unexpected departure from the prior art, which teaches the necessity of using compounds of metals which are electropositive with respect to hydrogen in reactions of this sort. See, for instance, Bevan, Haszeldine and Young, Chemistry and Industry, page 789 (1961), and Clark and Willis, Journal of the American Chemical Society, vol. 82, page 1888 (1960).

The art suggests many uses for 1,1-dihalocyclopropanes, for instance, the Journal of the American Chemical Society, vol. 81, page 2579 (1959), discloses that the 1,1-dihalocyclopropane formed from ketene acetals are readily pyrolyzed to alpha-organoacrylic esters. Also in the same Journal, vol. 83, page 603 (1961), there is a disclosure of the formation of chlorotropones by the elimination of methyl chloride from the 1,1-dihalocyclopropane derivative of methoxy napthalene. Many dihalocyclopropanes are known to have utility as fungicides and herbicides, for example see U.S. Patent 3,012,079.

What I claim as new and desire to secure by Letters Patent of the United States is as follows:

1. A proces for the production of 1,1-dihalocyclopropanes which comprises the step of reacting together a mixture comprising a trihalomethyl substituted mercurial having the formula R—Hg—CX$_3$ wherein X is a halogen and R is a radical selected from the group consisting of alkyls, cycloalkyls, mononuclear aryls, haloalkyls, halocycloalkyls, halomononuclear aryls, fluorine, chlorine, bromine, and iodine and at a temperature of from about 0° C. to about 150° C.

2. The process of claim 1 wherein said trihalomethyl substituted mercurial is a bromodihalomethyl substituted mercurial.

3. The process of claim 1 wherein said trihalomethyl substituted mercurial is a bromodichloromethyl substituted mercurial.

4. The process of claim 1 wherein said trihalomethyl mercurial is a dibromochloromethyl substituted mercurial.

5. The process of claim 1 wherein said trihalomethyl substituted mercurial is a trichloromethyl substituted mercurial.

6. The process of claim 1 wherein the reaction is conducted in an essentially inert solvent.

7. The process of claim 1 wherein the reaction is conducted at a temperature within the range of from about 30° C. to about 110° C.

8. The process of claim 1 wherein said mercurial is phenyltribromomethyl mercury.

9. The process of claim 1 wherein said mercurial is phenyltrichloromethyl mercury.

10. The process of claim 1 wherein said mercurial is phenylbromodichloromethyl mercury.

11. The process of claim 1 wherein said mercurial is phenyldibromochlorobethyl mercury.

12. A process for the production of 7,7-dihalobicyclo (4.1.0)heptane which comprises the step of reacting together a mixture of phenyltrihalomethyl mercury and cyclohexene at a temperature of from about 30° C. to about 110° C.

13. A process for the production of 1,1-dihalocyclopropanes which comprises the step of reacting together a mixture comprising a trihalomethyl substituted mercurial having the formula R—Hg—CX$_3$ wherein X is a halogen and R is a radial selected from the group consisting of alkyls, cycloalkyls, mononuclear aryls, haloalkyls, halocycloalkyls, halomononuclear aryls, fluorine, chlorine, bromine, and iodine and a dihalocarbene acceptor at a temperature of from about 0° C. to about 150° C., said trihalomethyl substituted mercurial containing at least one bromine substituent on the trihalomethyl group.

References Cited by the Examiner

Doering et al., "J. Am. Chem. Soc.," vol. 76, pp. 6162–5 (1954).

Reutov et al., "Doklady Akad. Nauk S.S.S.R.," vol. 139, pp. 622–5 (1961).

Seyferth et al., "J. of Org. Chem.," vol. 27 pp. 1491–92 (April 1962).

LEON ZITVER, *Primary Examiner.*

K. H. JOHNSON, K. V. ROCKEY,
*Assistant Examiners.*

UNITED STATES PATENT OFFICE
CERTIFICATE OF CORRECTION

Patent No. 3,265,745            August 9, 1966

Dietmar Seyferth et al.

It is hereby certified that error appears in the above numbered patent requiring correction and that the said Letters Patent should read as corrected below.

Column 6, line 12, after "and", second occurrence, insert -- a dihalocarbene acceptor --; line 38, for "phenyldibromochlorobethyl" read -- phenyldibromochloromethyl --.

Signed and sealed this 5th day of September 1967.

(SEAL)
Attest:

ERNEST W. SWIDER            EDWARD J. BRENNER
Attesting Officer            Commissioner of Patents